(12) United States Patent
Smith

(10) Patent No.: US 6,272,333 B1
(45) Date of Patent: Aug. 7, 2001

(54) METHOD AND APPARATUS IN A WIRELESS COMMUNICATION SYSTEM FOR CONTROLLING A DELIVERY OF DATA

(75) Inventor: Dwight Randall Smith, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/096,664

(22) Filed: Jun. 12, 1998

(51) Int. Cl.$^7$ .................................................. H04M 3/00
(52) U.S. Cl. ........................ 455/418; 455/419; 455/575
(58) Field of Search ................................. 455/418, 419, 455/420, 38.1, 524, 525, 575, 551, 88, 68, 70, 186.1, 517; 375/222, 202; 395/200.15, 200.18, 200.2

(56) References Cited

U.S. PATENT DOCUMENTS

| | | | |
|---|---|---|---|
| 5,291,598 | * | 3/1994 | Grundy ................................. 395/650 |
| 5,594,740 | * | 1/1997 | LaDue .................................... 379/59 |
| 5,699,275 | * | 12/1997 | Beasley et al. ....................... 364/514 |
| 5,790,809 | * | 8/1998 | Holmes ............................ 395/200.58 |
| 5,862,325 | * | 1/1999 | Reed et al. ....................... 395/200.31 |
| 5,881,235 | * | 3/1999 | Mills ................................ 395/200.51 |
| 5,896,566 | * | 4/1999 | Averbuch et al. ..................... 455/419 |
| 5,909,437 | * | 6/1999 | Rhodes et al. ........................ 370/349 |
| 5,930,704 | * | 7/1999 | Kay ....................................... 455/419 |
| 5,970,090 | * | 10/1999 | Lazaridis ............................. 375/222 |
| 5,974,085 | * | 10/1999 | Smith .................................. 375/222 |
| 6,005,884 | * | 12/1999 | Cook et al. .......................... 375/202 |
| 6,008,737 | * | 12/1999 | Deluca et al. ................... 340/825.34 |
| 6,026,366 | * | 2/2000 | Grube ................................... 705/10 |

* cited by examiner

*Primary Examiner*—Daniel Hunter
*Assistant Examiner*—C. Chow
(74) *Attorney, Agent, or Firm*—R. Louis Breeden

(57) ABSTRACT

A subscriber unit (122) maintains an application registry (226) for registering (404) applications accessible to the subscriber unit. A fixed portion (102) of a wireless communication system keeps (514) a current copy (324) of the application registry of the subscriber unit, and checks (520) the current copy of the application registry in response to having data to send to the subscriber unit. The fixed portion sends (526) the data only when the fixed portion determines (522) that an application compatible with the data is accessible to the subscriber unit.

13 Claims, 4 Drawing Sheets

METHOD AND APPARATUS IN A WIRELESS COMMUNICATION SYSTEM FOR CONTROLLING A DELIVERY OF DATA

FIELD OF THE INVENTION

This invention relates in general to wireless communication systems, and more specifically to a method and apparatus in a wireless communication system for controlling a delivery of data from a fixed portion of the wireless communication system to a subscriber unit.

BACKGROUND OF THE INVENTION

Prior-art messaging systems have utilized specific vector types, such as tone-only, numeric, and alphanumeric vector types, to control the type of data the fixed portion of the messaging system would send to a specific subscriber unit. Typically, control of the specific vector type has been implemented through class-of-service information.

As subscriber units become increasingly user customizable with enhanced software application upgradability, it is impractical to expect that a class-of-service distinction or a subscriber unit class can define all the types of data that the applications accessible to a specific subscriber unit can support. Further, it is unlikely that all subscriber units of a specific type will have identical applications having identical application version numbers. Nonetheless, it remains desirable not to send data to a subscriber unit that the subscriber unit cannot utilize.

Thus, what is needed is a method and apparatus for controlling the delivery of data from the fixed portion of the messaging system to the subscriber unit. Preferably, the method and apparatus will not require specific vector types and corresponding class-of-service information to define the types of data which the subscriber unit can utilize. In addition, the method and apparatus preferably will not require an over-the-air session for each delivery of data to determine whether the subscriber unit can utilize the specific data type.

SUMMARY OF THE INVENTION

An aspect of the present invention is a method in a wireless communication system for controlling a delivery of data from a fixed portion of the wireless communication system to a subscriber unit. The method comprises in the subscriber unit the step of maintaining an application registry for registering applications accessible to the subscriber unit. The method further comprises, in the fixed portion of the wireless communication system, the steps of keeping a current copy of the application registry of the subscriber unit, and checking the current copy of the application registry in response to having the data to send to the subscriber unit. The method further comprises, in the fixed portion of the wireless communication system, the step of sending the data only when the checking step determines that an application compatible with the data is accessible to the subscriber unit.

Another aspect of the present invention is a controller in a fixed portion of a wireless communication system for controlling a delivery of data to a subscriber unit which maintains an application registry for registering applications accessible to the subscriber unit. The controller comprises a network interface for accepting the data from an originator, and a processing system coupled to the network interface for processing the data, the processing system comprising a memory. The controller further comprises a base station interface coupled to the processing system for controlling a base station to transmit the data. The processing system is programmed to keep in the memory a current copy of the application registry of the subscriber unit, and to check the current copy of the application registry in response to having the data to send to the subscriber unit. The processing system is further programmed to send the data only when the checking step determines that an application compatible with the data is accessible to the subscriber unit.

Another aspect of the present invention is a subscriber unit in a wireless communication system for controlling a delivery of data from a fixed portion of the wireless communication system. The subscriber unit comprises a receiver for receiving the data, and a processing system coupled to the receiver for processing the data. The subscriber unit further comprises a transmitter coupled to the processing system for communicating with the fixed portion of the wireless communication system. The processing system is programmed to maintain an application registry for registering applications accessible to the subscriber unit; and, in response to a change in accessibility of an application, to update the application registry and control the transmitter to communicate the change to the fixed portion of the wireless communication system.

DETAILED DESCRIPTION OF THE DRAWINGS

Figure 1:
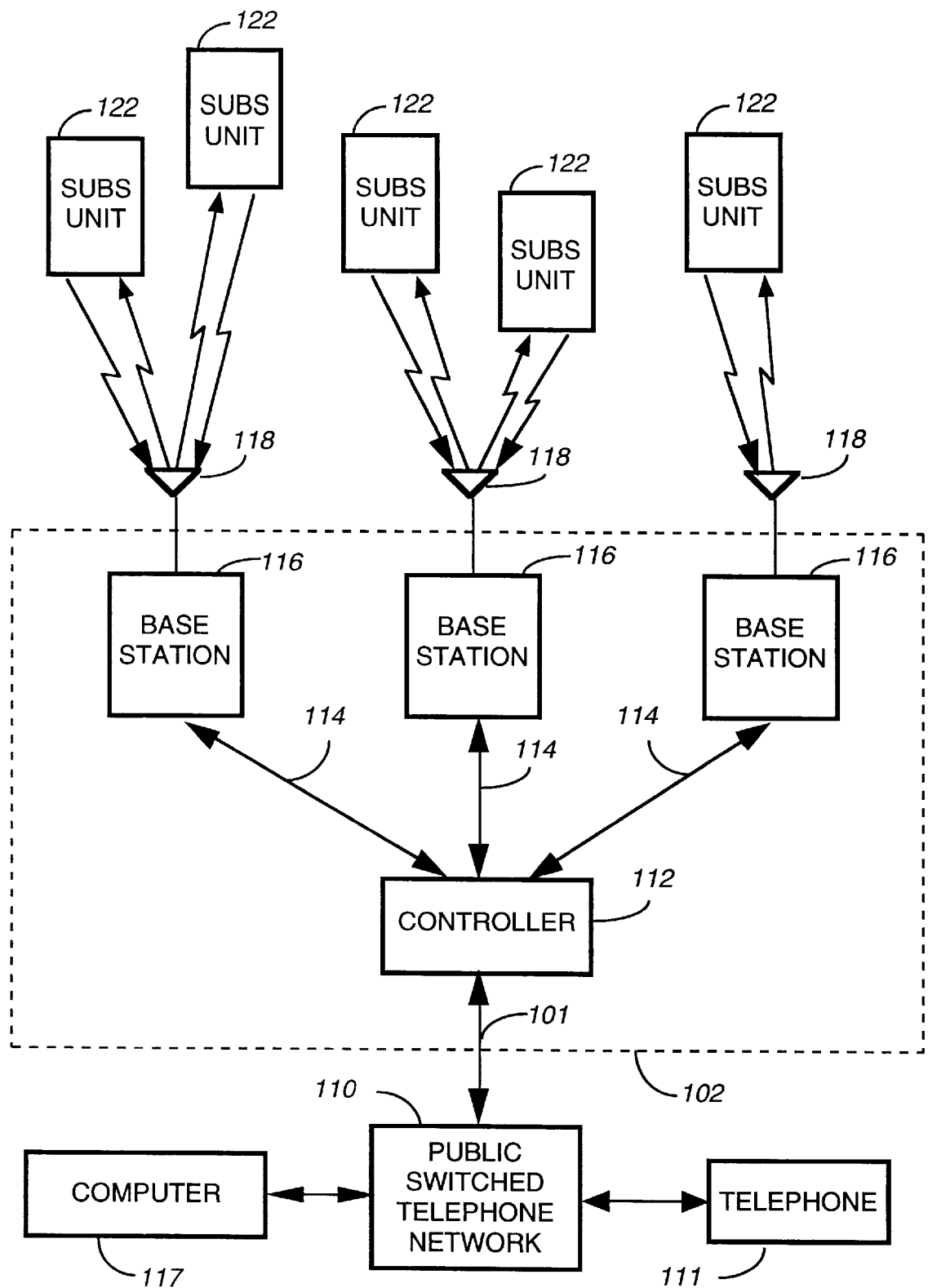
FIG. 1 is an electrical block diagram of a wireless communication system in accordance with the present invention.

Referring to FIG. 1, an electrical block diagram depicts an exemplary wireless communication system in accordance with the present invention comprising a fixed portion 102 including a controller 112 and a plurality of conventional base stations 116, the communication system also including a plurality of subscriber units 122. The base stations 116 preferably communicate with the subscriber units 122 utilizing conventional radio frequency (RF) techniques, and are coupled by conventional communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The software of the controller 112 is modified in accordance with the present invention. The hardware of the base stations 116 is preferably a combination of the RF-Orchestra! transmitter and RF-Audience!™ receivers manufactured by Motorola, Inc. The subscriber units 122 are preferably similar to PageWriter™ 2000 data messaging units, also manufactured by Motorola, Inc., and having software modified in accordance with the present invention. It will be appreciated that other similar hardware can be utilized as well for the controller 112, the base stations 116, and the subscriber units 122.

Each of the base stations 116 transmits RF signals to the subscriber units 122 via an antenna 118. The base stations 116 preferably each receive RF signals from the plurality of subscriber units 122 via the antenna 118. The RF signals transmitted by the base stations 116 to the subscriber units 122 (outbound messages) comprise selective call addresses identifying the subscriber units 122, and data messages originated by a message originator, as well as commands originated by the controller 112 for adjusting operating parameters of the radio communication system. The RF signals preferably transmitted by the subscriber units 122 to the base stations 116 (inbound messages) comprise responses that include scheduled messages, such as positive acknowledgments (ACKs) and negative acknowledgments (NAKs), and unscheduled messages, such as registration requests and application registry updates, in accordance with the present invention.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well.

Figure 2:
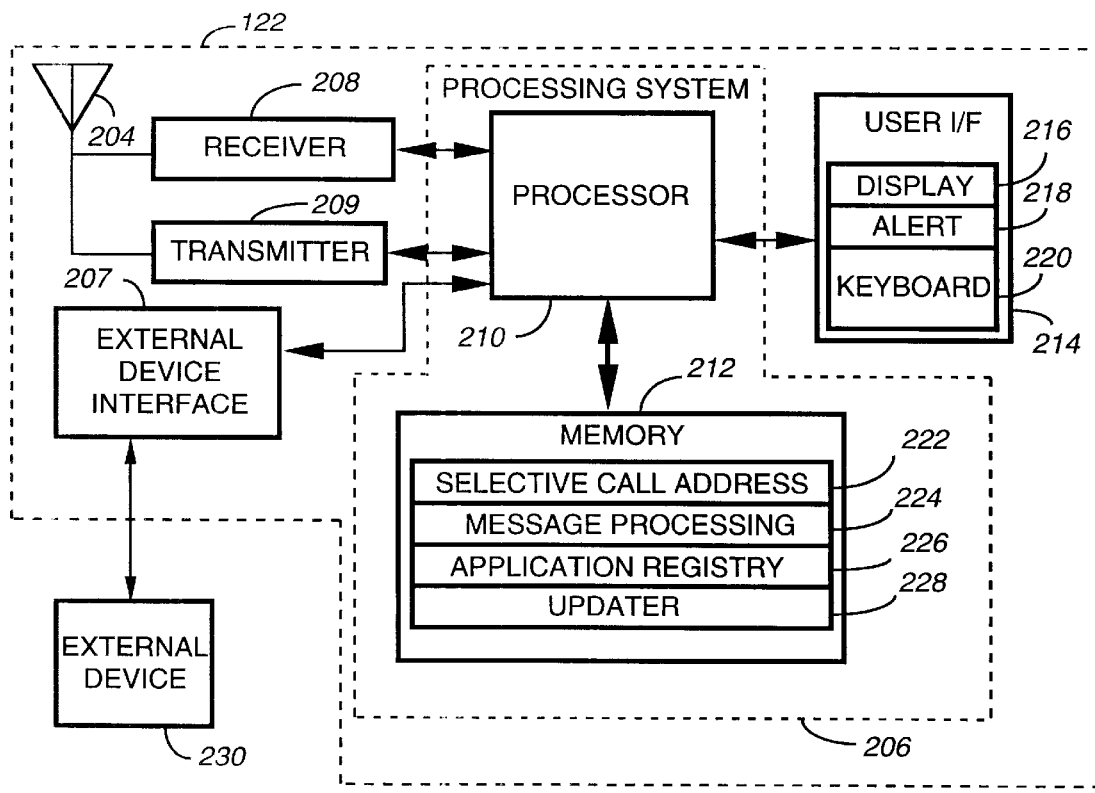
FIG. 2 is an electrical block diagram of a subscriber unit in accordance with the present invention.

FIG. 2 is an electrical block diagram of an exemplary subscriber unit 122 in accordance with the present invention. The subscriber unit 122 is depicted coupled to an external device 230, such as a personal computer for accessing software applications therefrom. The subscriber unit 122 comprises an antenna 204 for intercepting an outbound message and for transmitting an inbound message. The antenna 204 is coupled to a conventional receiver 208 for receiving the outbound message and coupled to a conventional transmitter 209 for transmitting the inbound message. The receiver 208 and transmitter 209 are coupled to a processing system 206 for processing the outbound and inbound messages. A user interface 214 preferably is also coupled to the processing system 206 for interfacing with a user. The user interface 214 comprises a conventional display 216 for displaying the inbound and outbound messages, a conventional alert element 218 for alerting the user when the outbound message arrives, and a conventional keyboard 220 for generating the inbound message and for controlling the subscriber unit 122. A conventional external device interface 207 preferably is also coupled to the processing system 206 for coupling the subscriber unit 122 to the external device 230.

The processing system 206 comprises a conventional processor 210 and a conventional memory 212. The memory 212 comprises software elements and other variables for programming the processing system 206 in accordance with the present invention. The memory 212 preferably includes a selective call address 222 to which the subscriber unit 122 is responsive. In addition, the memory 212 includes a message processing element 224 for programming the processing system 206 to process messages through well-known techniques. The memory 212 further comprises an application registry 226 in accordance with the present invention. The application registry 226 comprises a list of applications that are accessible to the subscriber unit 122. The applications can reside either internal to or external to the subscriber unit 122, e.g., in a personal computer to which the subscriber unit 122 is connected. In addition, the application registry 226 preferably includes an application version number corresponding to each application. The memory 212 also includes an updater element 228 for programming the processing system 206 to control the transmitter 209 to communicate a change in the application registry 226 to the fixed portion 102 of the wireless communication system.

Figure 3:
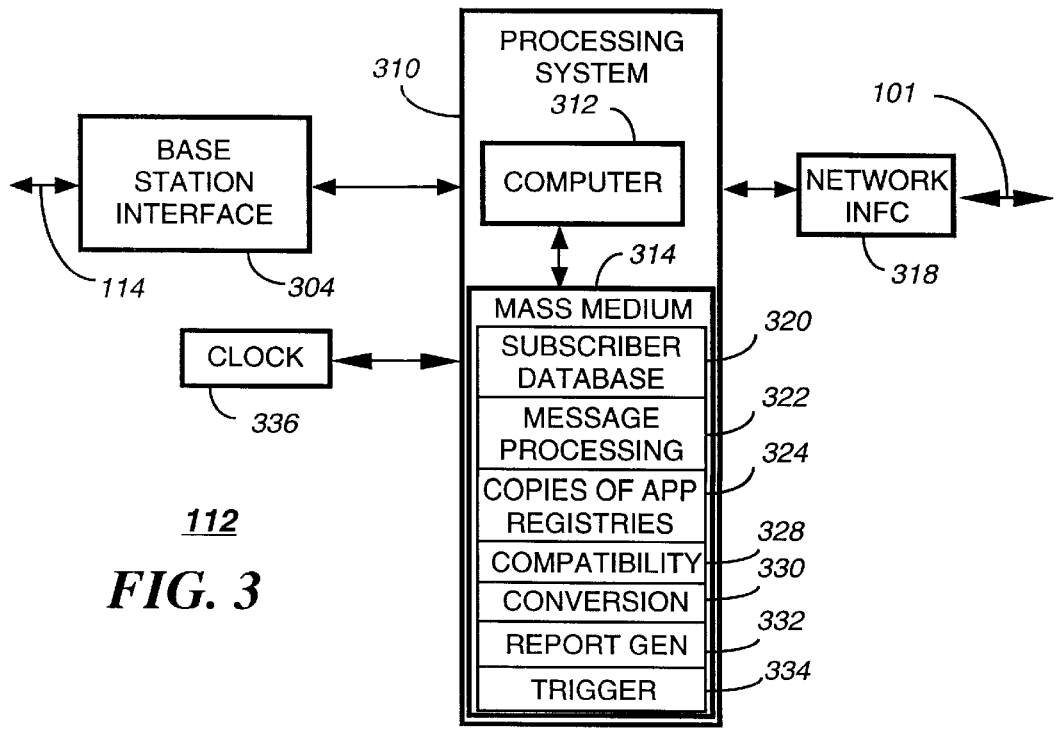
FIG. 3 is an electrical block diagram of a controller in accordance with the present invention.

FIG. 3 is an electrical block diagram depicting an exemplary controller 112 in accordance with the present invention. The controller 112 comprises a network interface 318 for receiving a message from a message originator via the telephone links 101. The network interface 318 is coupled to a processing system 310 for controlling and communicating with the network interface 318. The processing system is coupled to a base station interface 304 for controlling and communicating with the base stations 116 via the communication links 114. The processing system 310 is also coupled to a conventional clock 336 for providing a timing signal to the processing system 310. The processing system 310 comprises a conventional computer 312 and a conventional memory, preferably a mass medium 314, e.g., a magnetic disk drive, programmed with information and operating software in accordance with the present invention. The mass medium 314 comprises a conventional subscriber database 320 for storing profiles defining service for subscribers using the system. The mass medium 314 further comprises a message processing element 322 for processing messages through well-known techniques.

The mass medium 314 also includes current copies 324 of application registries of the subscriber units 122 operating in the wireless communication system, in accordance with the present invention. In addition, the mass medium 314 includes a compatibility element 328 for programming the processing system 310 to check the current copy 324 of the application registry of the subscriber unit 122 in response to having data to send to the subscriber unit 122, and to send the data only when the current copy 324 of the application registry indicates that an application compatible with the data is accessible to the subscriber unit 122 for which the data is intended. The mass medium 314 also includes a conversion element 330 for programming the processing system 310 to convert data that is incompatible with the applications accessible to the subscriber unit 122 for which the data is intended, to a format that is compatible with one of the applications accessible to the subscriber unit 122. The mass medium 314 further comprises a report generating element 332 for programming the processing system 310 to examine the current copies 324 of application registries of the subscriber units 122 to generate a report of how many users use which version of which applications. The mass medium 314 also includes a trigger element 334 for programming the processing system 310 to check the application version number of an application in response to a predetermined stimulus, and to take a predetermined action to trigger a software update when the application version number is an old version. The predetermined stimulus can be, for example, the receipt of an update to the application registry 226 of the subscriber unit 122 which adds an application not present in the current copy 324. This can occur when a user purchases and installs a new application, or when the user connects the subscriber unit 122 to a previously disconnected external device. Another example of the predetermined stimulus is an appearance in the wireless communication system of a new application version number, resulting, for example, from a system software update. Still another example of the predetermined stimulus is a registration of a new subscriber unit 122 in the wireless communication system.

An example of taking a predetermined action to trigger a software update when the application version number is an old version, is generating a notification message to the users corresponding to the old version. The notification message can, for example, advise that a new version is available, state where and how to obtain the new version, provide hints and tips about the new version, and recommend add-ons that will enhance the new version. Another example of a predetermined action (preferably for small applications) is to automatically download the new version over the air. Still another example is to disable the currently running application when it is no longer being supported by the wireless communication system. Another alternative (preferred for larger programs) is to provide wireline access to the latest version, and to notify the affected users to download the latest version by wireline, e.g., via the Internet. The alternative selected depends mainly upon the desires of the wireless service provider and the size of the application.

Figure 4:
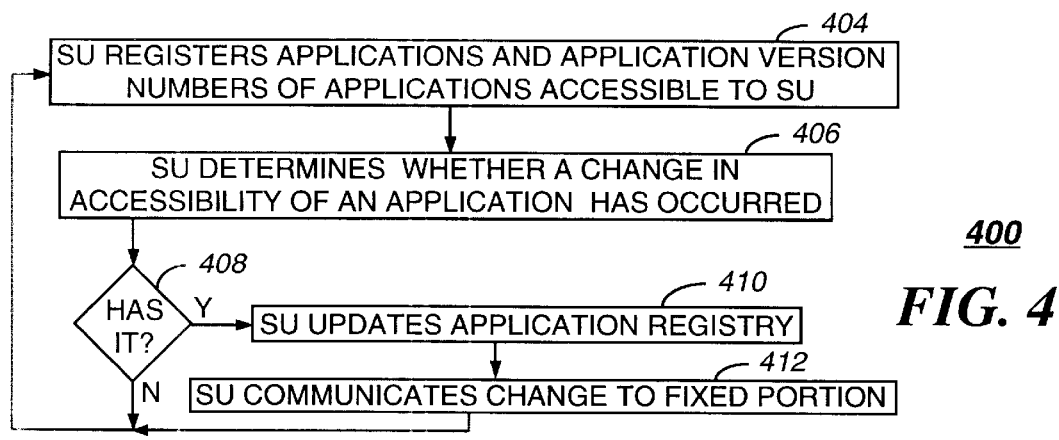
FIG. 4 is a flow diagram depicting operation of the subscriber unit for maintaining an application registry in accordance with the present invention.

FIG. 4 is a flow diagram 400 depicting operation of the subscriber unit 122 for maintaining the application registry in accordance with the present invention. At step 404 the processing system 206 of the subscriber unit 122 registers the applications accessible to the subscriber unit 122, along with the corresponding application version numbers, into the application registry 226. The processing system 206 then monitors the status of the subscriber unit 122 to determine 406 whether a change in the accessibility of an application has occurred, e.g., through the installation of a new application, or through coupling the subscriber unit 122 to a previously uncoupled external device 230, or through uncoupling the subscriber unit 122 from a previously coupled external device 230. At step 408, if a change in the accessibility of an application has occurred, then the processing system 206 accesses the updater element 228 and updates 410 the application registry 226. The processing system 206 then controls the transmitter 209 to communicate 412 the change to the fixed portion 102, so that the processing system 310 of the controller 112 can update its copy 324 of the application registry corresponding to the subscriber unit 122. Flow then returns to step 404. If, on the other hand, at step 408 no change in the accessibility of an application has occurred, then the flow simply returns to step 404.

Figure 5:
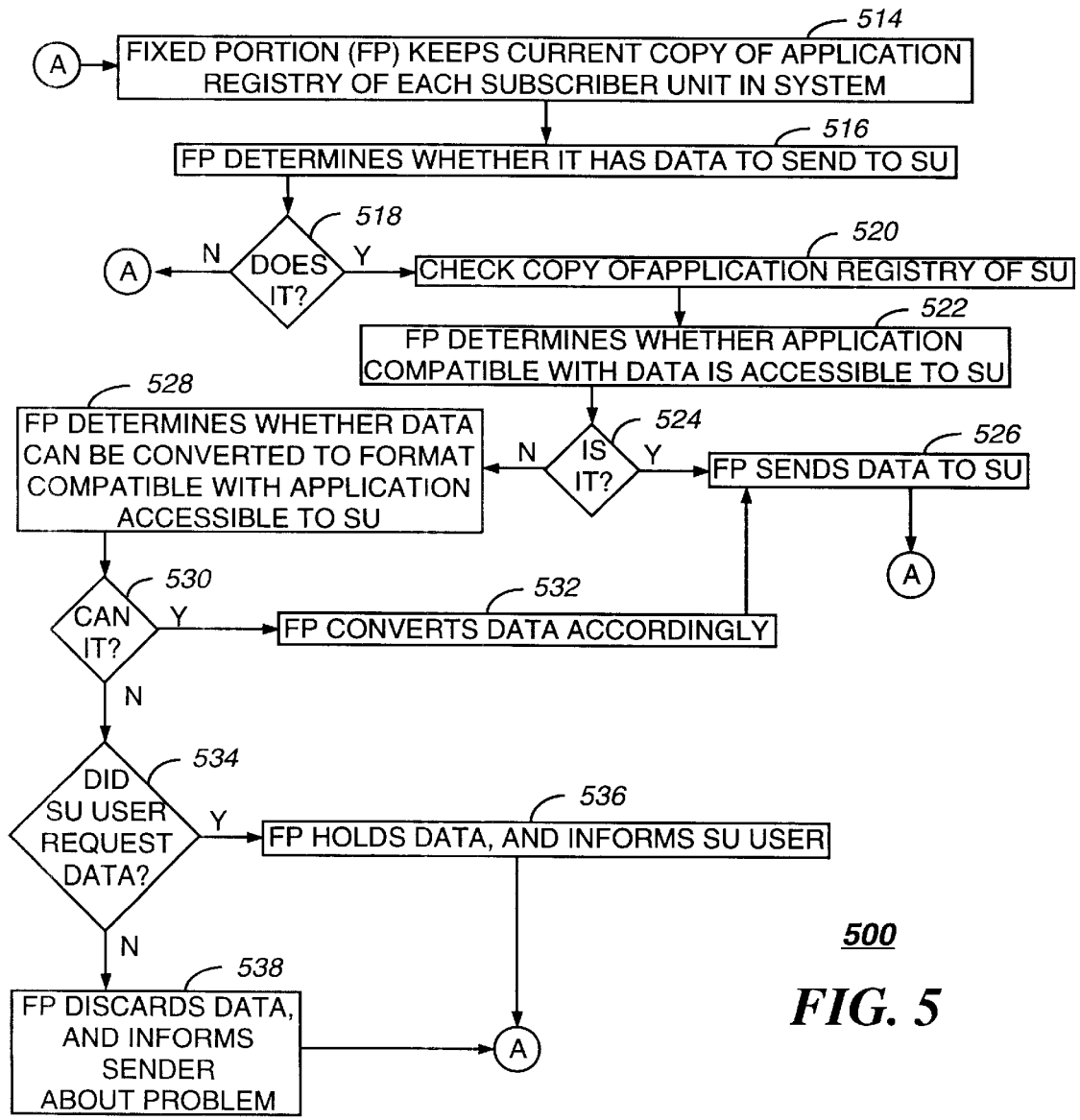
FIG. 5 is a flow diagram depicting a first operation of the controller in accordance with the present invention.

FIG. 5 is a flow diagram 500 depicting a first operation of the controller 112 in accordance with the present invention. At step 514 the processing system 310 of the controller 112 keeps a current copy 324 of the application registry 226 of each subscriber unit 122 in the wireless communication system. The current copy 324 is preferably programmed into the mass medium 314 when the subscriber unit 122 is initially activated in the wireless communication system. The current copy 324 is updated in response to communications from the subscriber unit 122 whenever the subscriber unit 122 updates its application registry 226. In addition, the controller 112 preferably performs periodic synchronization routines, using well-known techniques to ensure that the current copies 324 of application registries remain identical to the application registries 226 in the subscriber units 122.

At step 516, the processing system 310 determines whether it has data to send to one of the subscriber units 122. If not, at step 518 the processing system 310 returns to step 514. If, on the other hand, the processing system 310 does have data to send to one of the subscriber units 122, then after step 518 the processing system 310 checks 520 the current copy 324 of the application registry of the subscriber unit 122 to determine 522 whether an application compatible with the data is accessible to the subscriber unit 122. If so, at step 524 the processing system 310 sends 526 the data to the subscriber unit 122, and the flow returns to step 514. If, on the other hand, the processing system 310 determines that no application compatible with the data is accessible to the subscriber unit 122, then at step 524 the processing system 310 accesses the conversion element 330 to determine 528 whether the data can be converted to a format compatible with an application that is accessible to the subscriber unit 122. If so, at step 530 the processing system 310 converts 532 the data to a format compatible with an application that is accessible to the subscriber unit 122, and then sends 526 the data to the subscriber unit 122, after which the flow returns to step 514. If, on the other hand, the processing system 310 determines that the data cannot be converted to a format compatible with an application that is accessible to the subscriber unit 122, the flow moves from step 530 to step 534. At step 534 the processing system 310 checks whether the user of the subscriber unit 122 requested the data. If so, the processing system 310 holds the data in the mass medium 314, and notifies the user that the data is being held, but requires an application that is not currently accessible to the subscriber unit 122. Flow then returns to step 514. If, on the other hand, at step 534 the user did not request the data, then the processing system 310 discards 538 the data, and informs the sender about the compatibility problem. Flow then returns to step 514.

Figure 6:
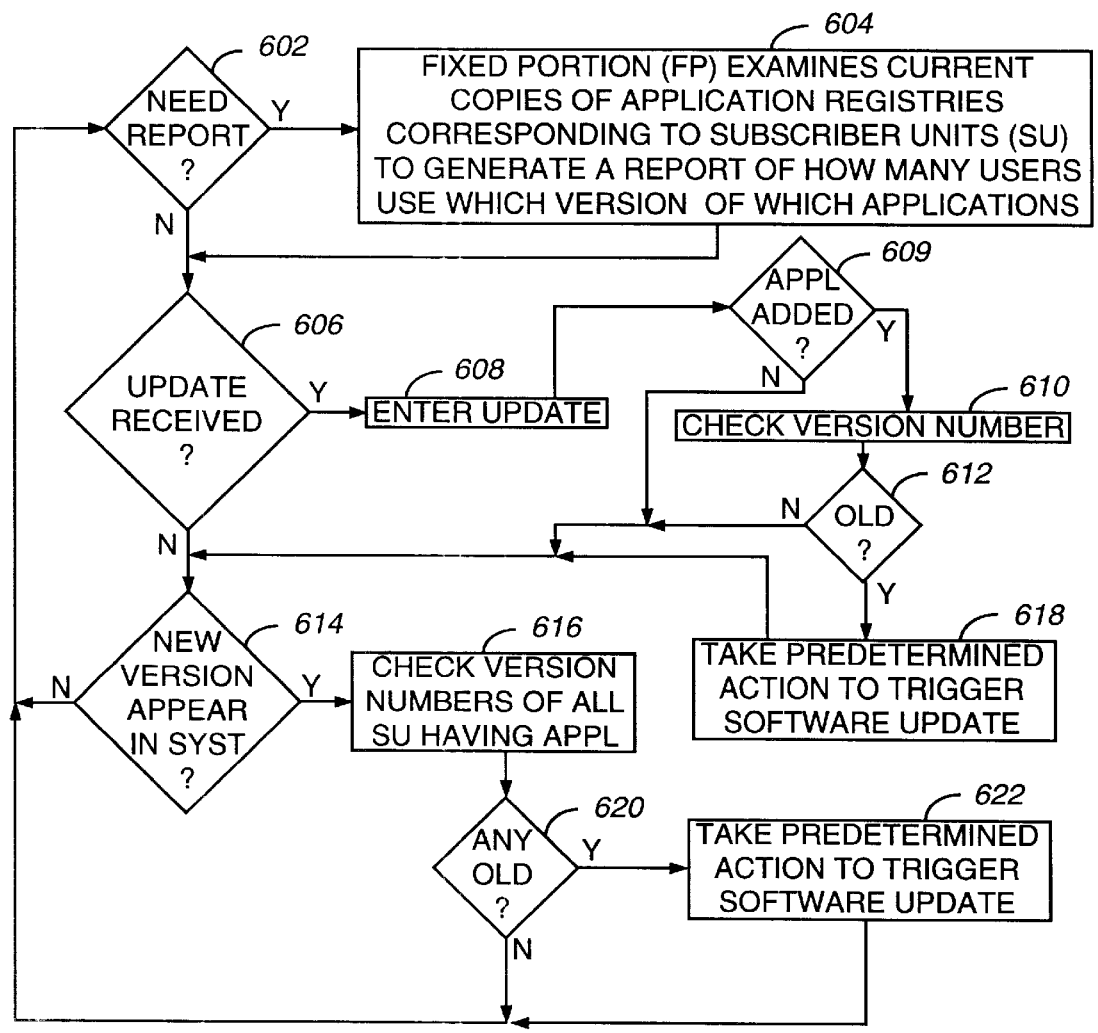
FIG. 6 is a flow diagram depicting a second operation of the controller in accordance with the present invention.

FIG. 6 is a flow diagram 600 depicting a second operation of the controller 112 in accordance with the present invention. The flow begins with the processing system 310 determining 602 whether a demographic report is needed. The demographic report can, for example, be requested by the wireless service provider through a keyboard-display terminal (not shown) coupled to the processing system 310. If the report is needed, then the processing system 310 accesses the report generating element 332 and examines the current copies 324 of the application registries corresponding to the subscriber units 122 to generate a report of how many users use which version of which applications. In any case, flow then moves to step 606, where the processing system 310 checks whether an update has been received from one of the subscriber units 122. If so, the processing system 310 enters 608 the update in the current copy 324 of the application registry corresponding to the subscriber unit 122. The processing system 310 then determines 609 whether the update was to add an application that has become accessible to the subscriber unit 122. If so, the processing system 310 checks 610 the application version number to determine whether the application is an old version. If, at step 612, the application version is old, the processing system 310 takes 618 a predetermined action, as described herein above, to trigger a software update. If not, the flow moves to step 614. If, on the other hand, at step 609 the update was not to add an application, the flow simply moves to step 614.

If, on the other hand, at step 606 no update has been received, the flow moves to step 614, where the processing system 310 checks whether a new application version has appeared in the wireless communication system since the last check. If so, the processing system 310 checks 616 the application version numbers of the subscriber units 122 that have access to the application that has been upgraded to the new version. If at step 620, any of the version numbers are old, then the processing system 310 takes 622 a predetermined action, as described herein above, to trigger a software update by the affected subscriber units 122. The flow then returns to step 602. If at step 620 none of the version numbers are old, then the flow simply returns to step 602.

Thus, it should be clear from the preceding disclosure that the present invention provides a method and apparatus for controlling the delivery of data from the fixed portion of a messaging system to a subscriber unit. Advantageously, the method and apparatus does not require specific vector types and corresponding class-of-service information to define the types of data which the subscriber unit can utilize. In addition, the method and apparatus advantageously does not require an over-the-air session for each delivery of data to determine whether the subscriber unit can utilize a specific data type.

Many modifications and variations of the present invention are possible in light of the above teachings. Thus, it is to be understood that, within the scope of the appended claims, the invention can be practiced other than as described herein above.

What is claimed is:

1. A method in a wireless communication system for controlling a delivery of data from a fixed portion of the wireless communication system to a subscriber unit, the method comprising in the subscriber unit the step of:
   maintaining an application registry comprising a list of all software applications that are currently accessible to the subscriber unit; and
   in the fixed portion of the wireless communication system, the steps of:
      keeping a current copy of the application registry of the subscriber unit;
      checking the current copy of the application registry in response to having the data to send to the subscriber unit; and
      sending the data only when the checking step determines that an application compatible with the data is accessible lo the subscriber unit.

2. The method of claim 1, further comprising, in the fixed portion before the sending step, the step of
   converting incompatible data to a format compatible with one of the applications accessible to the subscriber unit.

3. The method of claim 1, wherein the maintaining step comprises, in response to a change in accessibility of an application, the steps of:
   updating the application registry; and
   communicating the change to the fixed portion of the wireless communication system.

4. The method of claim 1,
   wherein the maintaining step comprises the step of
      registering an application version number for at least one of the applications accessible to a plurality of subscriber units; and
   wherein the method further comprises, in the fixed portion of the wireless communication system, the step of
      examining a plurality of current copies of application registries corresponding to the plurality of subscriber units to generate a report of how many users use which version of which applications.

5. The method of claim 1,
   wherein the maintaining step comprises the step of
      registering an application version number for at least one of the applications accessible to the subscriber unit; and
   wherein the method further comprises, in the fixed portion of the wireless communication system, the steps of:
      checking the application version number for the at least one of the applications in response to a predetermined stimulus; and
      taking a predetermined action to trigger a software update when the application version number is an old version.

6. The method of claim 5, wherein the step of checking the application version number is performed in response to one of: a) a receipt of an update to the application registry of the subscriber unit which adds an application not present in the current copy, b) an appearance in the wireless communication system of a new application version number, and c) a registration of a new subscriber unit in the wireless communication system.

7. A controller in a fixed portion of a wireless communication system for controlling a delivery of data to a subscriber unit which maintains an application registry comprising a list of all software applications that are currently accessible to the subscriber unit, the controller comprising:
   a network interface for accepting the data from an originator;
   a processing system coupled to the network interface for processing the data, the processing system comprising a memory; and
   a base station interface coupled to the processing system for controlling a base station to transmit the data;
   wherein the processing system is programmed to:
      keep in the memory a current copy of the application registry of the subscriber unit;
      check the current copy of the application registry in response to having the data to send to the subscriber unit; and
      send the data only when an application compatible with the data is accessible to the subscriber unit.

8. The controller of claim 7, wherein the processing system is further programmed to
   convert incompatible data to a format compatible with one of the applications accessible to the subscriber unit.

9. The controller of claim 7,
   wherein a plurality of subscriber units register an application version number for at least one of the applications accessible to the plurality of subscriber units, and
   wherein the processing system is further programmed to examine a plurality of current copies of application registries corresponding to the plurality of subscriber units to generate a report of how many users use which version of which applications.

10. The controller of claim 7,
    wherein the subscriber unit registers an application version number for at least one of the applications accessible to the subscriber unit, and
    wherein the processing system is further programmed to:
       check the application version number for the at least one of the applications in response to a predetermined stimulus; and
       take a predetermined action to trigger a software update when the application version number is an old version.

11. The controller of claim 10, wherein the processing system is further programmed to check the application version number in response to one of: a) a receipt of an update to the application registry of the subscriber unit which adds an application not present in the current copy, b) an appearance in the wireless communication system of a new application version number, and c) a registration of a new subscriber unit in the wireless communication system.

12. A subscriber unit in a wireless communication system for controlling a delivery of data from a fixed portion of the wireless communication system, the subscriber unit comprising:

a receiver for receiving the data;

a processing system coupled to the receiver for processing the data; and a transmitter coupled to the processing system for communicating with the fixed portion of the wireless communication system, wherein the processing system is programmed to:

maintain an application registry comprising a list of all software applications that are currently accessible to the subscriber unit; and in response to a change in accessibility of an application, update the application registry; and control the transmitter to communicate the change to the fixed portion of the wireless communication system.

13. The subscriber unit of claim 12, wherein the processing system is further programmed to register an application version number for at least one of the applications accessible to the subscriber unit.

* * * * *